April 23, 1940.　　J. R. McGILL　　2,198,124
WATER TREATING APPARATUS
Filed Aug. 5, 1938　　4 Sheets-Sheet 1

Inventor
J. R. McGill
By Clarence A. O'Brien
and Hyman Berman
Attorneys

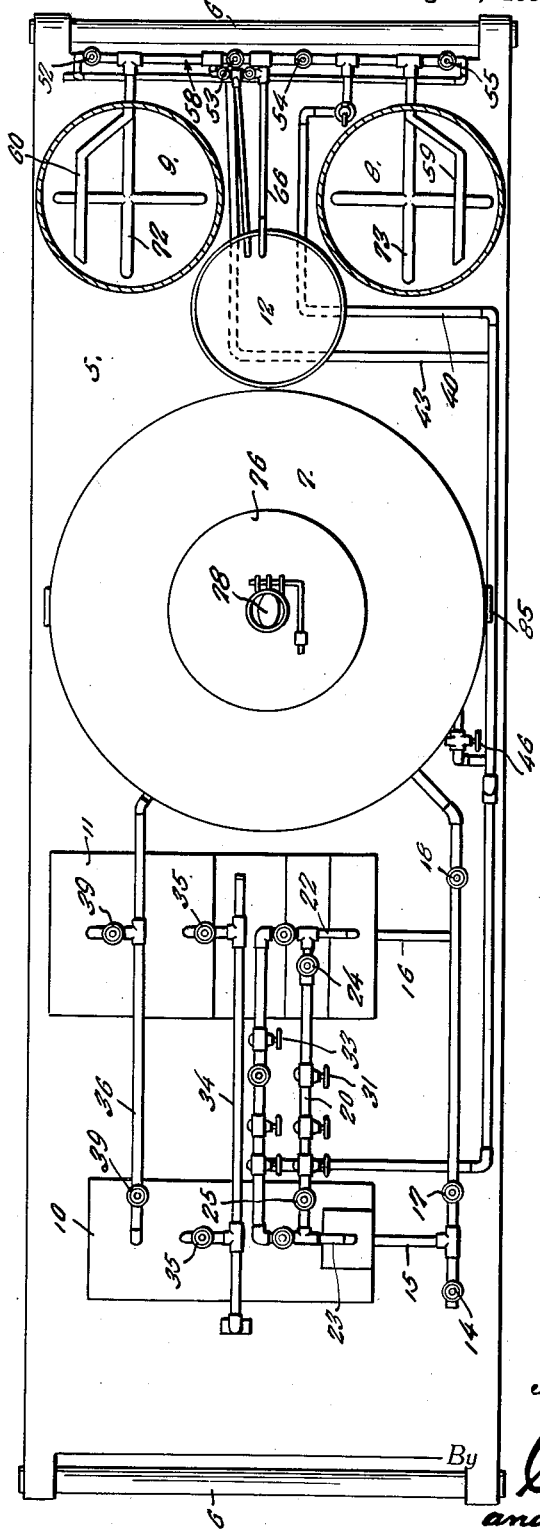

April 23, 1940. J. R. McGILL 2,198,124
WATER TREATING APPARATUS
Filed Aug. 5, 1938 4 Sheets-Sheet 3
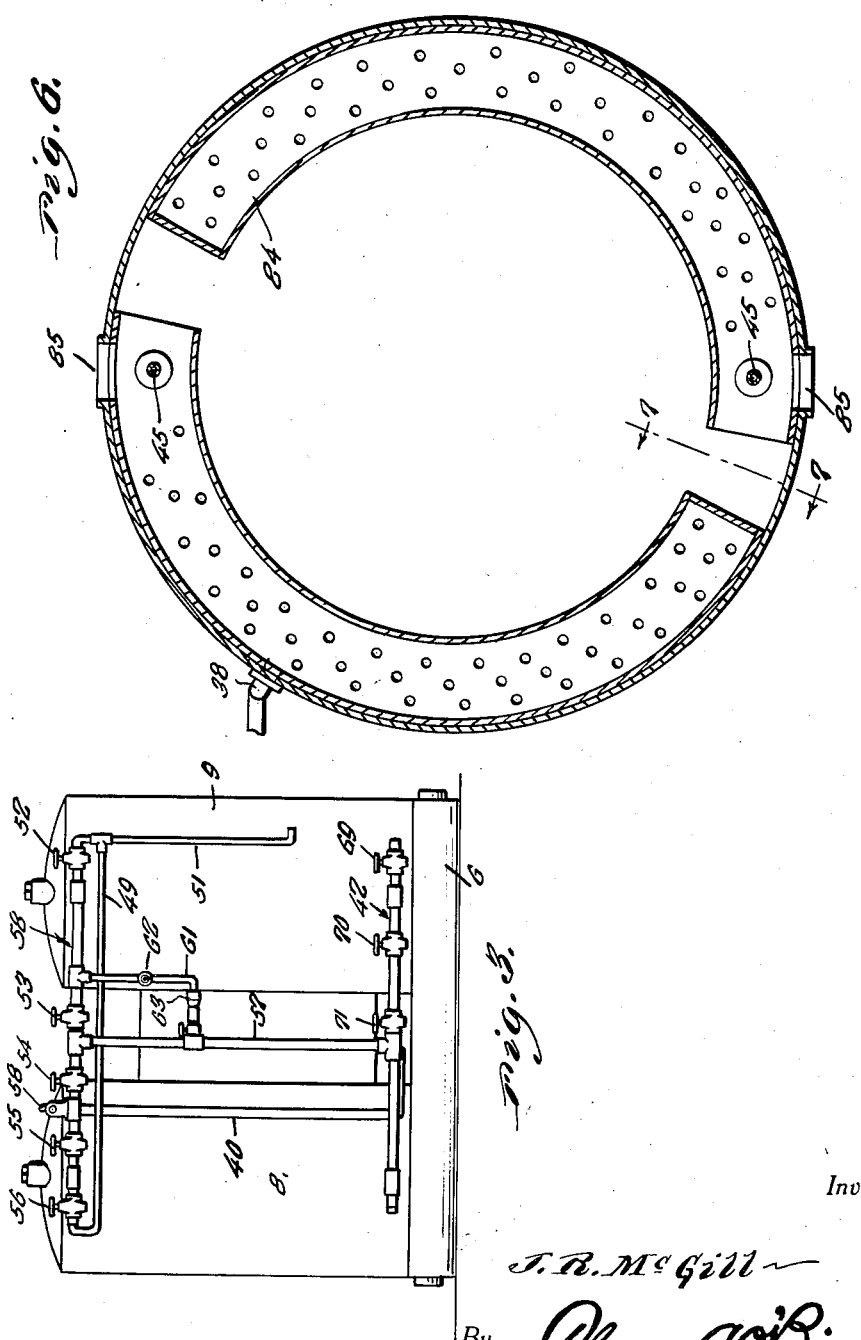

April 23, 1940. J. R. McGILL 2,198,124
WATER TREATING APPARATUS
Filed Aug. 5, 1938 4 Sheets-Sheet 4
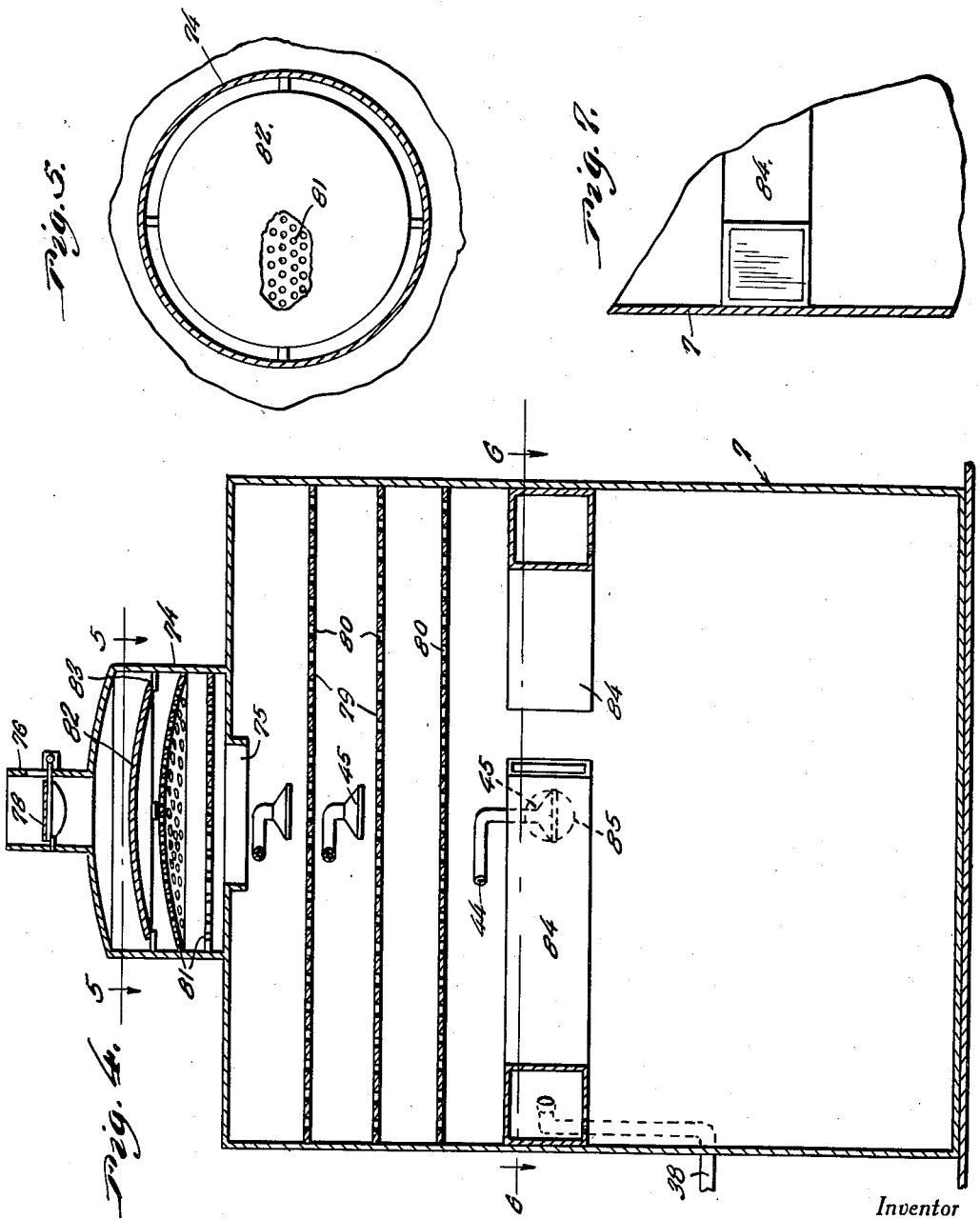
Inventor
J. R. McGill
By Clarence A. O'Brien
and Hyman Berman
Attorneys Patented Apr. 23, 1940

2,198,124

UNITED STATES PATENT OFFICE 2,198,124

WATER TREATING APPARATUS

James R. McGill, Amarillo, Tex., assignor to Superior Manufacturing Company, Amarillo, Tex.

Application August 5, 1938, Serial No. 223,331

8 Claims. (Cl. 210—14)

The present invention relates to recovering exhaust steam from engines, pumps, turbines and similar devices, by condensing the exhaust steam back into its liquid state through the employment of a novel means of introducing a heat exchange between the steam and cold water and by impingement of the steam upon resistant surfaces, to cause radiation.

The primary object of this invention is the provision of a device especially adapted for preheating of boiler feed water, conditioning* of said water and the recovery of exhaust steam from steam operated devices.

*Interpret "conditioning" as: rendering non-scale forming and removing suspended impurities.

Another object of this invention is to cause at the same time, the preheating of cold boiler feed water by heat exchange between it and exhaust steam received from the steam operated devices, and also to provide for efficient handling and control of excess water and the storage thereof.

A further object of this invention is to provide for variable circulation of water between a storage vessel and the vessel in which the condensing of the steam occurs in order that proper proportions of water to the amount of steam to be condensed may be maintained for efficient heat exchange between the steam and water.

A further object of this invention is the provision of means for conditioning the raw water by a selected chemical or chemicals so as to remove suspended and dissolved matter which may be damaging to the best operation of boilers through the formation of scale or sludge therein.

A further object of this invention is to provide for the impelling of water and condensate from the condensing vessel or storage vessel to closed boilers or similar devices with the flow of water under efficient control at all times.

A still further object of this invention is the provision of a device of the above stated character which will be economical to construct and maintain in operation and may be readily transported from one place to another. An excellent illustration of the utility of this device is in connection with oil well drilling equipment which is moved from one place to another, the present device being readily movable therewith.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a diagrammatical view illustrating a water treating apparatus constructed in accordance with my invention.

Figure 2 is a top plan view illustrating the device.

Figure 3 is an end view illustrating the device.

Figure 4 is a vertical sectional view illustrating the condensing vessel.

Figure 5 is a sectional view taken on line 5—5 of Figure 4.

Figure 6 is a sectional view taken on line 6—6 of Figure 4.

Figure 7 is a sectional view taken on line 7—7 of Figure 6.

Figure 1:
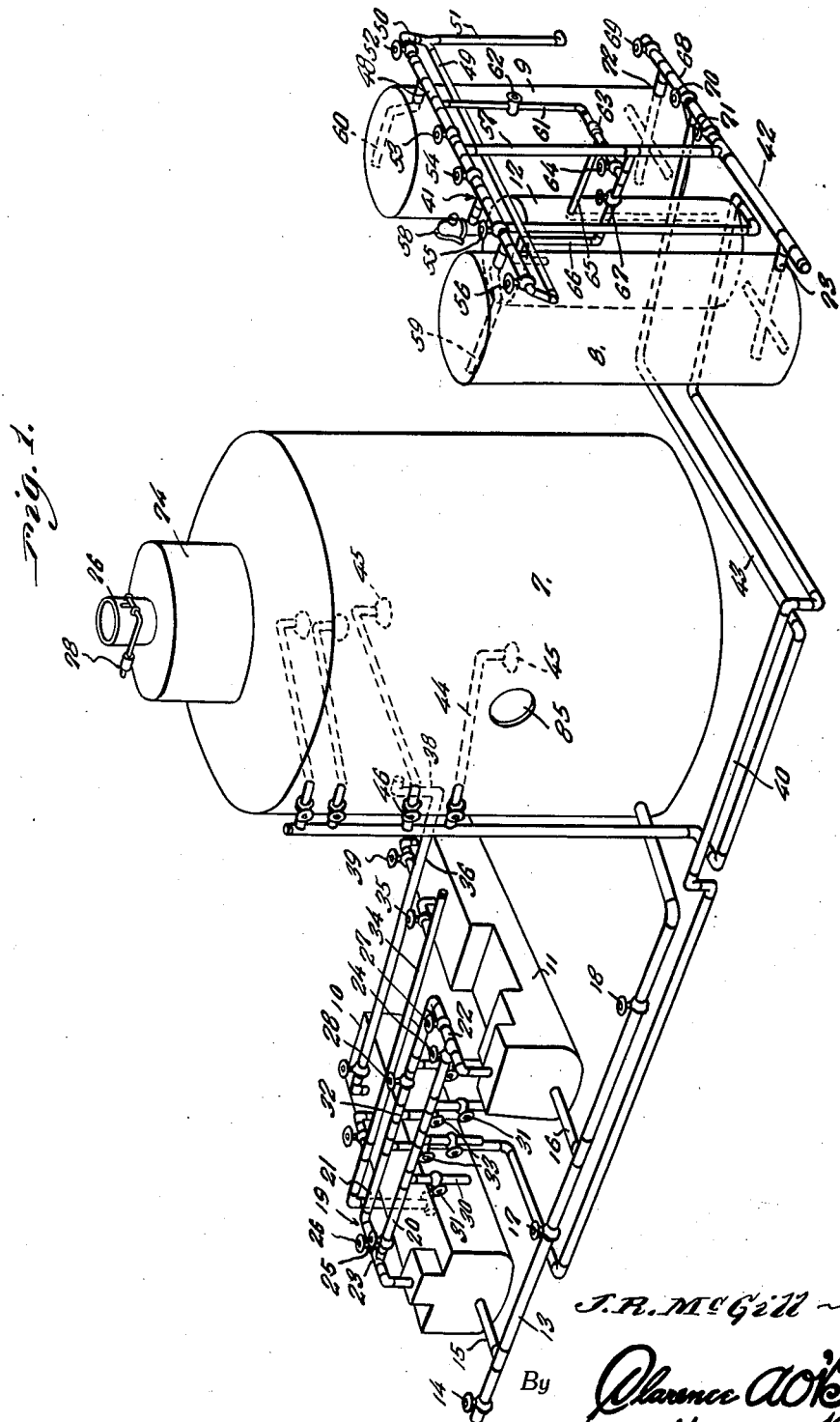

Referring in detail to the drawings, the numeral 5 indicates an elongated base equipped with suitable hand grips 6 whereby the base may be conveniently lifted for the purpose of placing the same on a truck or like vehicle for transportation from one place to another. The base is of such a size that it will readily accommodate the apparatus and still be easy for a minimum number of men to move and lift when desired.

Mounted on the base and substantially intermediate the ends thereof is a condensing vessel 7. Mounted on the base 5, adjacent one end thereof, is a filtering vessel 8 and a chemical conditioning vessel 9. Mounted on the base 5 between the other end thereof and the condensing vessel 7 are pumps 10 and 11 of any well known construction and preferably of the steam operated type. Located adjacent the vessels 8 and 9 is a chemical container or vessel 12 also mounted on the base. Mounted on the base 5 is a feed water pipe 13 having a main control valve 14 and adapted to be connected with a raw water supply. The main water feed pipe 13 is connected directly to the pump 10 by a pipe 15. The pump 11 is connected to the feed water pipe 13 by a pipe 16. A valve 17 is arranged in the feed pipe 13 for the purpose of cutting off raw water to the pump 11. The feed pipe 13 is also connected to the lower portion of the condensing vessel as clearly shown in Figure 1 and has a cutoff valve 18 located therein for closing raw water to the condensing vessel whenever desired.

Primarily the pump 10 is employed for forcing the raw water while the pump 11 is primarily employed for forcing the conditioned water and condensate to steam boilers or like devices. However, through an arrangement of pipe system which will be described in detail, should either one of the pumps become inoperative from any cause the other pump may be readily brought into operation to function for the inoperative pump.

Connected to the pumps 10 and 11 is a manifold 19 consisting of parallel pipes 20 and 21 connected by end pipes 22 and 23. The pipe 20 has cutoff valves 24 and 25 adjacent the ends thereof. Cutoff valves 26 and 27 are arranged in the end pipes 23 and 22. The end pipe 22 is connected to the pump 11 and the end pipe 23 is connected to the pump 10. The pipe 21 has a cutoff valve 28. It is to be understood that the manifold 19 is connected to the outlets of the pumps 10 and 11 by the end pipes 23 and 22 thereof being connected to said outlets of the pumps. The pipe 20 has connected thereto between the valves 24 and 25 thereof a plurality of outlet pipes 30 each having a cutoff valve 31. The pipe 21 is also equipped with outlet pipes 32 having cutoff valves 33.

A steam feed pipe 34 leading from a steam boiler (not shown) is connected to the pumps 10 and 11 and is provided with control valves 35. The exhaust steam pipe for the pumps 10 and 11 is shown by the numeral 36 and is connected with the condensing vessel 7, as shown at 38, and has cutoff valves 39.

A pipe 40 connects the pipe 20 of the manifold 19 with a manifold 41 employed for the filtering and conditioning vessels 8 and 9 and arranged directly under the manifold 41 is a manifold 42 also employed for the filtering and chemical conditioning vessels 8 and 9. The manifold 42 has connected thereto a pipe 43 which leads to a point adjacent the condensing vessel and has connected thereto a series of branch pipes 44 leading into the condensing vessel at different places therein and each equipped with a spray nozzle 45 and a cutoff valve 46.

The manifold 41 consists of pipes 48 and 49 having the ends thereof connected together, as shown at 50, and to a common outlet pipe 51 acting as a drain. The pipe 48 is provided with cutoff valves 52, 53, 54, 55 and 56, the valves 52 and 56 being arranged adjacent the ends of the pipe 48. The manifold 42 is connected to the pipe 48 between the valves 53 and 54 by a pipe 57. The pipe 48 has the pipe 40 connected thereto between the valves 54 and 55. The pipe 40 adjacent to its point of connection with the pipe 48 is provided with a safety valve 58. The pipe 48 is connected to the upper end of the filtering vessel 8 by a pipe 59, the latter being connected to the pipe 48 between the valves 55 and 56. The pipe 48 is also connected to the upper end of the chemical conditioning vessel by a pipe 60, the latter being connected to the pipe 48 between the valves 52 and 53. A pipe 61 is connected to the pipe 48 between the valves 52 and 53 and is provided with cutoff valves 62 and 64. A pipe 65 is connected to an ejector 63, in the pipe 61 between the valves 62 and 64 and leads into the chemical supply tank or vessel 12 and terminates adjacent the bottom thereof. A pipe 66 enters the upper end of the chemical tank or vessel and is connected to the pipe 57 and to the end of the pipe 61 and has a cutoff valve 67 therein, between vessel 12 and connection of pipe 61 thereto.

The manifold 42 consists of a pipe 68 provided with cutoff valves 69, 70 and 71. The pipe 43 is connected to the pipe 68 between the valves 70 and 71. The pipe 68 is connected to the lower end of the chemical conditioning vessel by a pipe 72 including a perforated cross arrangement arranged in said vessel 9. The pipe 72 is connected to the pipe 68 between the valves 69 and 70. A pipe 73 is connected to the pipe 68 and leads into the lower end of the filtering vessel 8 in the form of a perforated cross arrangement.

The condensing vessel 7 has a dome 74 at its upper end and in communication therewith by a port 75. The dome 74 is provided with an outlet stack 76 having located therein a damper 78. Arranged in the upper portion of the condensing vessel are spaced baffles 79 provided with perforations 80 and arranged in the dome in superimposed relation are perforated baffles 81 and arranged above the uppermost perforated baffle 81 is a baffle 82 of solid formation having its edges spaced from the dome and supported, as shown at 83. Arranged a limited distance below the lowermost baffle 79 are arcuately curved boxlike steam inlet chambers 84 suitably supported on the walls of the condensing vessel and in communication with steam inlet ports 85 and the latter are adapted to be suitably connected to the exhaust of steam driven devices (not shown). Certain of the spray nozzles 45 are located in the box-like chambers 84 adjacent to where the steam enters the latter, while the other spray nozzles are arranged above certain of the baffles 79. The steam chambers 84 exhaust into the condensing vessel by means of perforations in the floors of the chambers a considerable distance above the bottom of said vessel so that between the said steam chambers 84, and the bottom of the vessel a collecting chamber is provided for condensate and water to be taken off therefrom by the pump 11 through the pipe 13 when the valve 18 is open, or by pump 10 through pipe 13 with valves 18 and 17 open. The steam entering the steam chambers 84 impinges against solid walls prior to escaping into condensing vessel 7, from said chambers by means of the perforations in their floors and is subjected to treated cold water received from the filtering vessel and the chemical conditioning vessel so that the water and steam meeting tend to condense the steam into liquid form. Any steam escaping from the chambers 84 is retarded in escape from the condensing vessel by way of the dome and stack 76 by the baffles, also is subjected to conditioned or treated cold water by the spray nozzles 45 arranged adjacent certain of the baffles 79 so that practically no steam escapes from the condensing vessel. Or in other words, practically all of the steam is condensed into liquid form for collection with the treated water in the lower portion of the condensing vessel to be taken off therefrom and delivered to a storage tank and boilers as the latter need the same through the operation of the pump 11.

It is to be understood that through the arrangement of the manifold on the pump the chemically conditioned water and condensate in the condensing vessel accumulate much more rapidly than can be consumed by the steam boiler, therefore, an outlet 32, from manifold pipe 21, between valves 22 and 28 to a storage tank or receptacle (not shown) is provided to recirculate the surplus treated water through the raw water storage tank from whence it can be again introduced into the invention through valve 14.

Through the arrangement of the manifolds 19, 41 and 42 all water taken from a supply by the pump 10 may be forced through the filtering vessel 8 and the chemical conditioning vessel 9 and delivered in spray form into the condensing vessel for co-mingling with the steam to bring about condensation of the latter so that the water within said condensing vessel will be in proper condition for use in steam boilers and like devices without the danger of creating corrosion, scale or sludge in such devices.

Through the arrangement of the manifolds 41 and 42 and pipes 61, 65, and 66 the chemical conditioning vessel can be supplied with chemicals from the supply vessel 12 whenever chemical is needed in the vessel. Also the chemical vessel as well as the filtering vessel may be flushed with raw or conditioned water when it is necessary to clean them of foreign matter.

During the operation of this apparatus it is to be understood that the steam condensed in the condensing vessel by the introduction of chemically treated cold water will rapidly bring about condensation of the steam into liquid form and to preheat the water entering said condensing vessel so that when delivered to the boilers by the pump 11 its temperature will be so increased in Fahrenheit that there will be no tendency of chilling the boiler.

The damper 78 arranged in the stack 76 is of the hinged weighted type normally urged into stack-closing position by the weight and should any excessive pressure develop in the condensing vessel the damper 78 will be opened thereby and allow the excessive pressure to escape to the atmosphere. The condensing vessel may be equipped with suitable pressure gages also the filtering vessel and chemical conditioning vessel may have pressure gages. The pressure gages referred to are not shown and may be of any standard type.

It is a purpose of this invention to effect a great saving in chemical or minerals necessary for conditioning boiler feed water. This is effected inasmuch as a great portion of the feed water is composed of condensed exhaust steam which necessarily does not need additional conditioning because it is in effect distilled water. It is only the remaining portion of the feed water used for the condensing of the steam that requires conditioning, this water being conditioned by being passed through the filtering vessel and chemical treating vessel prior to reaching the condensing vessel. The construction of the filtering vessel and chemical vessel may be of any well known type. The device has proven from actual tests to effect a great saving in fuel for closed boilers, to deliver such boilers a feed water in a high state of purity from sediment, scale forming dissolved elements, suspended matter and at a very high temperature. It has proven itself capable of reducing a great percentage of exhaust steam from steam consuming devices back to its liquid state as condensate and at the same time rendering such condensate available for use again in the boilers.

It is believed that the foregoing description, when taken in connection with the drawings, will fully set forth the construction and advantages of this invention to those skilled in the art to which such device relates.

What I claim is:

1. A portable water treating apparatus for steam boilers comprising a portable base, a condensing vessel mounted on said base to receive exhaust steam, water filtering and chemical treating means mounted on said base and connected to said condensing vessel for introducing into the steam cold purified and chemically treated water for the condensing of the steam and the preheating of said water, means carried by said base for supplying raw cold water to said water filtering and chemical treating means and acting to force said water therefrom into the condensing vessel, and means mounted on said base for the removal of the water and condensate in the condensing vessel and the deliverance thereof to a boiler.

2. A water treating apparatus for steam boilers comprising a condensing vessel adapted to receive exhaust steam, water filtering and chemical treating means connected to said condensing vessel for the introduction into the steam cold purified and chemically treated water for the condensation of the steam and the preheating of said water, a raw water pump connected to a water supply and to said water filtering and chemical treating means for supplying water thereto and forcing said water into the condensing vessel, pumps connected with the condensing vessel to remove therefrom condensate and the preheated water for introduction into a boiler, a base for supporting said pumps, condensing vessel and the water filtering and chemical treating means to permit moving thereof from one place to another.

3. A water treating apparatus for steam boilers comprising a condensing vessel adapted to receive exhaust steam, water filtering and chemical treating means connected to said condensing vessel for the introduction into the steam cold purified and chemically treated water for the condensation of the steam and the preheating of said water, a raw water pump connected to a water supply and to said water filtering and chemical treating means for supplying water thereto and forcing said water into the condensing vessel, pumps connected with the condensing vessel to remove therefrom condensate and the preheated water for introduction into a boiler, a base for supporting said pumps, condensing vessel and the water filtering and chemical treating means to permit moving thereof from one place to another, means for interconnecting the pumps with each other, means for connecting the pumps with the water filtering and chemical treating means and the condensing vessel to permit either of said pumps to act in the capacity of the other pump when one of the pumps is inoperative from any cause, and means connected to the water filtering and chemical treating means for the introduction of chemical thereto as needed.

4. A water treating apparatus for steam boilers comprising a condensing vessel adapted to receive exhaust steam, chambers for the distribution of the steam in said vessel, baffles for intercepting the movement of the steam after leaving said chambers, a filtering and chemical treating means connected to said chambers and associated with said baffles for the introduction of cold treated water for condensing the steam and for preheating of the water by the steam during the condensation of said steam.

5. A water treating apparatus for steam boilers comprising a condensing vessel adapted to receive exhaust steam, chambers for the distribution of the steam in said vessel, baffles for intercepting the movement of the steam after leaving said chambers, a filtering and chemical treating means connected to said chambers and associated with said baffles for the introduction of cold treated water for condensing the steam and for preheating of the water by the steam during the condensation of said steam, a dome associated with said condensing vessel and open to the atmosphere, a pressure operated damper for said dome.

6. A water treating apparatus for steam boilers comprising a condensing vessel adapted to receive exhaust steam, chambers for the distribution of the steam in said vessel, baffles for intercepting the movement of the steam after leaving said chambers, a filtering and chemical treating means connected to said chambers and associated with said baffles for the introduction of cold treated water for condensing the steam and for preheating of the water by the steam during the condensation of said steam, a dome associated with said condensing vessel and open to th atmosphere, a pressure operated damper for said dome, and perforated and non-perforated baffles arranged in the dome with the non-perforated baffles spaced from walls of the dome.

7. A water treating apparatus for steam boilers comprising a condensing vessel, arcuately curved box-like chambers in said vessel, means for admitting exhaust steam to said chambers for escape into the vessel, baffles arranged in the vessel above said chambers, means for introducing into said chambers and over certain of said baffles cold filtered and chemically treated water for condensing the steam and preheating the water by the steam during the condensation thereof.

8. A water treating apparatus for steam boilers comprising a condensing vessel, arcuately curved box-like chambers in said vessel, means for admitting exhaust steam to said chambers for escape into the vessel, baffles arranged in the vessel above said chambers, means for introducing into said chambers and over certain of said baffles cold filtered and chemically treated water for condensing the steam and preheating the water by the steam during the condensation thereof, a dome associated with the vessel above the baffles and open to the atmosphere, a pressure actuated damper in said dome, perforated and non-perforated baffles arranged in the dome between the damper and the first-named baffles.

JAMES R. McGILL.